United States Patent
Aizawa

(10) Patent No.: US 10,146,184 B2
(45) Date of Patent: Dec. 4, 2018

(54) HOLOGRAM GENERATION APPARATUS AND HOLOGRAM GENERATION METHOD

(71) Applicant: JVC KENWOOD Corporation, Yokohama-shi, Kanagawa (JP)

(72) Inventor: Tadashi Aizawa, Yokohama (JP)

(73) Assignee: JVC KENWOOD CORPORATION, Kanagawa (JP)

( * ) Notice: Subject to any disclaimer, the term of this patent is extended or adjusted under 35 U.S.C. 154(b) by 139 days.

(21) Appl. No.: 15/455,671

(22) Filed: Mar. 10, 2017

(65) Prior Publication Data

US 2017/0185038 A1  Jun. 29, 2017

Related U.S. Application Data

(63) Continuation of application No. PCT/JP2015/003316, filed on Jul. 1, 2015.

(30) Foreign Application Priority Data

Sep. 30, 2014 (JP) .................. 2014-199675

(51) Int. Cl.
G03H 1/26 (2006.01)
G03H 1/30 (2006.01)
G03H 1/04 (2006.01)
G03H 1/08 (2006.01)
G03H 1/02 (2006.01)

(52) U.S. Cl.
CPC .......... *G03H 1/265* (2013.01); *G03H 1/0476* (2013.01); *G03H 1/0891* (2013.01); *G03H 1/26* (2013.01); *G03H 1/30* (2013.01); *G03H 2001/0232* (2013.01); *G03H 2001/048* (2013.01); *G03H 2001/0415* (2013.01); *G03H 2210/56* (2013.01)

(58) Field of Classification Search
CPC .... G03H 1/265; G03H 1/0476; G03H 1/0891; G03H 1/26; G03H 1/30; G03H 2001/0232; G03H 2001/0415; G03H 2001/048; G03H 2210/56
USPC ............................................. 359/21
See application file for complete search history.

(56) References Cited

FOREIGN PATENT DOCUMENTS

JP  3593359 B2  11/2004
JP  3608747 B2  1/2005

OTHER PUBLICATIONS

Honda et. al., "Production of Hologram", JP3593359B2, machine translation (Year: 2004).*

* cited by examiner

*Primary Examiner* — Bumsuk Won
*Assistant Examiner* — Wen Huang
(74) *Attorney, Agent, or Firm* — Procopio, Cory, Hargreaves & Savitch LLP

(57) ABSTRACT

A hologram generation apparatus includes an LCOS, an LCOS display control unit configured to form a partial hologram generation display area and positioning hologram generation display areas on a display surface of the LCOS, an object light optical system configured to apply object light onto a recording medium and generate a partial hologram and positioning holograms, the object light being generated by the partial hologram generation display area and the positioning hologram generation display areas, and a position control unit configured to determine a position of an partial hologram to be generated next based on positions of the generated positioning holograms.

10 Claims, 8 Drawing Sheets

<WHEN POSITION IS ALIGNED>

<WHEN POSITION IS MISALIGNED>

→ EXPOSURE + MOVEMENT

┄→ MOVEMENT

SUCCESSIVE EXPOSURES

HOLOGRAM GENERATION APPARATUS AND HOLOGRAM GENERATION METHOD

CROSS REFERENCE TO RELATED APPLICATION

This application is continuation application from PCT application No. PCT/JP2015/003316 filed Jul. 1, 2015, which claims the benefit of priority from Japanese patent application No. 2014-199675, filed on Sep. 30, 2014, the disclosure of which is incorporated herein in its entirety by reference.

BACKGROUND

The present invention relates to a hologram generation apparatus and a hologram generation method, and in particular to a hologram generation apparatus including a spatial light modulator unit and a hologram generation method.

A hologram generation method using a liquid crystal display panel or the like as an SLM (Spatial Light Modulator, Spatial Light Modulation element, or Spatial Light Modulation device) has been known as disclosed in, for example, Japanese Patent No. 3593359 (hereinafter referred to as Patent Literature 1). In this method, a hologram is generated by generating object light by modulating the amplitude and the phase of light branched from a yardstick light source (or a reference light source) by using an SLM, making the other light, i.e., reference light branched from the yardstick light source interfere with the object light, and performing exposure with the interference fringes. Patent Literature 1 has a characteristic feature that it can generate a unique hologram by generating object light by using a successively-rewritable liquid crystal display panel without using an original plate.

Meanwhile, a method for generating a relatively large-sized hologram (a multi-layout hologram) by forming a plurality of partial holograms disposed adjacent to each other has been known as disclosed in Japanese Patent No. 3608747 (hereinafter referred to as Patent Literature 2). In Patent Literature 2, in order to make a seam between adjacent holograms inconspicuous, the seam between holograms is formed by a group of different straight lines or different curved lines, instead of forming it by one straight line.

As another example, when a wiring pattern is formed on a silicon wafer in a semiconductor manufacturing process, a technique for smoothly connecting joint parts in the pattern by adopting a so-called "connecting exposure" is used when the entire pattern cannot be covered by one exposure range, though it is not a technique for generating a hologram.

SUMMARY

Patent Literature 1 uses a liquid crystal display device as an SLM and generates a desired hologram by giving a computer-calculated phase distribution or an amplitude distribution to laser light, making the laser light interfere with reference right through a telecentric optical system, and applying the resultant light onto a photosensitive surface. Regarding successive exposures, Patent Literature 1 discloses a configuration in which a photosensitive material is moved on the photosensitive surface, and unique holograms can be successively generated on the same photosensitive material by using the liquid crystal display device as the SLM.

However, in the configuration disclosed in Patent Literature 1, the photosensitive material is placed on an XY-stage and the successive exposures are performed by simply moving the photosensitive material. Therefore, depending on the accuracy of the movement of the stage, a deviation could occur between successively-exposed hologram patterns. In particular, when a large hologram is generated, the deviation becomes larger, thus possibly deteriorating the accuracy of the generation of the hologram.

Patent Literature 2 proposes, as a technique effective for a large-sized hologram or for a hologram color filter for a projection-type liquid crystal display device in which an image is projected in an enlarged size, a method for realizing a large hologram in which multiple hologram original plates whose external shapes each consist of a set of lengthwise straight lines and crosswise straight lines or a set of curved lines are laid out (i.e., multi-layouts) and when they include interference fringes different from each other, the same number of hologram original plates as the number of the multi-layouts are prepared. Patent Literature 2 has a merit that a seam is made inconspicuous by forming the external shape of each of the partial holograms constituting the whole hologram by a set of straight lines or curved lines, instead of forming it by one straight line.

However, in Patent Literature 2, the shapes of the partial holograms are complicated. In particular, when each of the partial holograms is a unique hologram, it is necessary to prepare hologram original plates (patterns) each of which corresponds to a respective one of the types of holograms. Therefore, it is very difficult to easily generate all the holograms in a state where they are accurately aligned with each other.

As described above, there is a problem in the related art that it is very difficult to easily and accurately generate a hologram.

Accordingly, an embodiment provides a hologram generation apparatus including: a spatial light modulation unit configured to modulate incident light; a spatial light modulation control unit configured to form an object hologram generation area and first and second positioning hologram generation areas on a modulation surface of the spatial light modulation unit; an exposure unit configured to apply object light onto a recording medium and generate a first object hologram and first and second positioning holograms, the object light being generated based on the object hologram generation area and the first and second positioning hologram generation areas; and a position determination unit configured to determine a position of a second object hologram based on positions of the generated first and second positioning holograms, the second object hologram being a hologram to be generated on a periphery of the first object hologram.

Further, the embodiment provides a hologram generation method including: forming an object hologram generation area and first and second positioning hologram generation areas on a modulation surface of a spatial light modulation unit; applying object light onto a recording medium and generating a first object hologram, and first and second positioning holograms, the object light being generated based on the object hologram generation area and the first and second positioning hologram generation areas; and determining a position of a second object hologram based on positions of the generated first and second positioning holograms, the second object hologram being a hologram to be generated on a periphery of the first object hologram.

DETAILED DESCRIPTION

First Exemplary Embodiment

A first exemplary embodiment according to the present invention is explained hereinafter with reference to the drawings. This exemplary embodiment makes it possible to easily and accurately generate a hologram array in which unique holograms are connected together by performing successive exposures on the same surface of a recording medium in a hologram generation apparatus using an SLM (Spatial Light Modulator).

Figure 1:
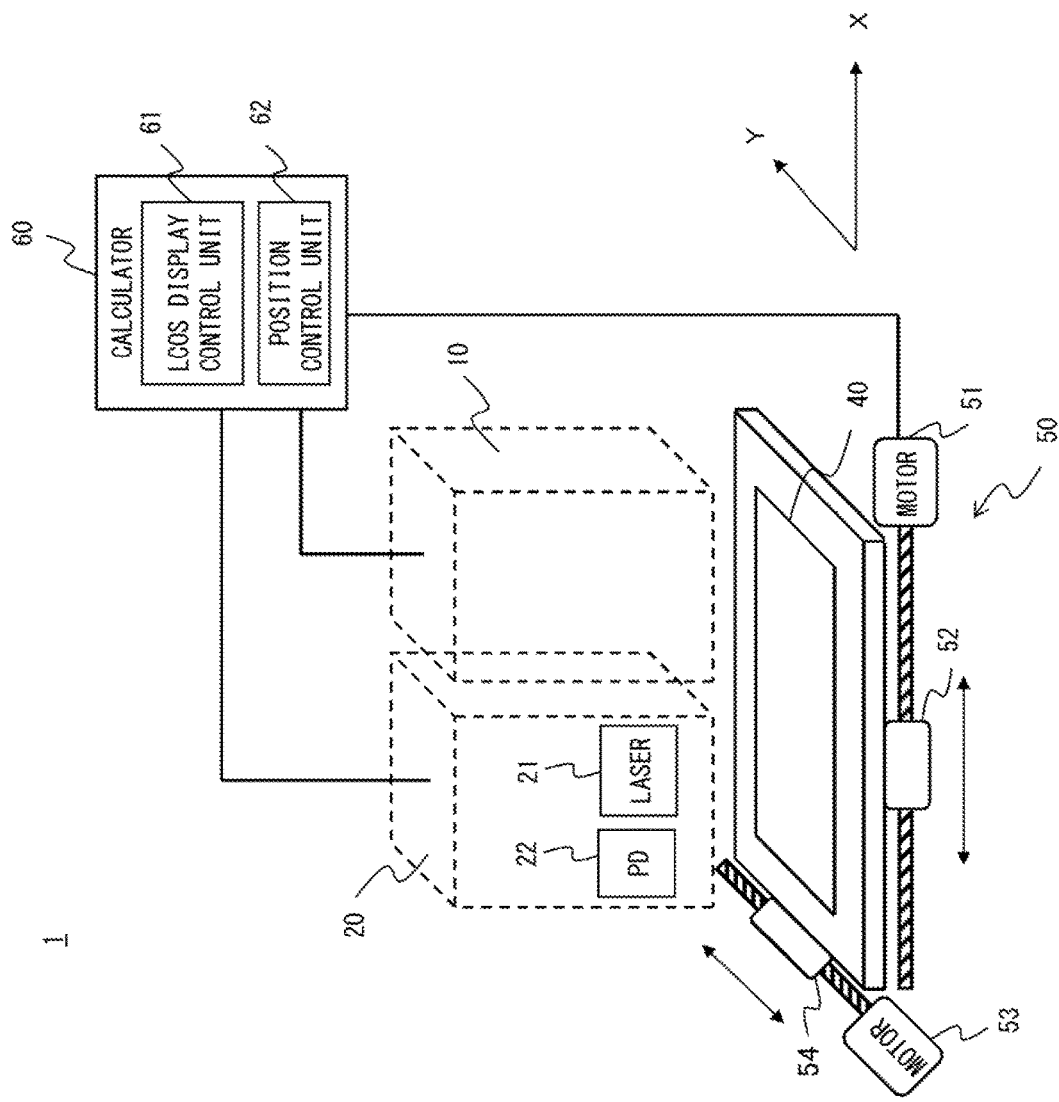
FIG. 1 shows a schematic configuration of a hologram array generation apparatus according to a first exemplary embodiment.
Figure 2:
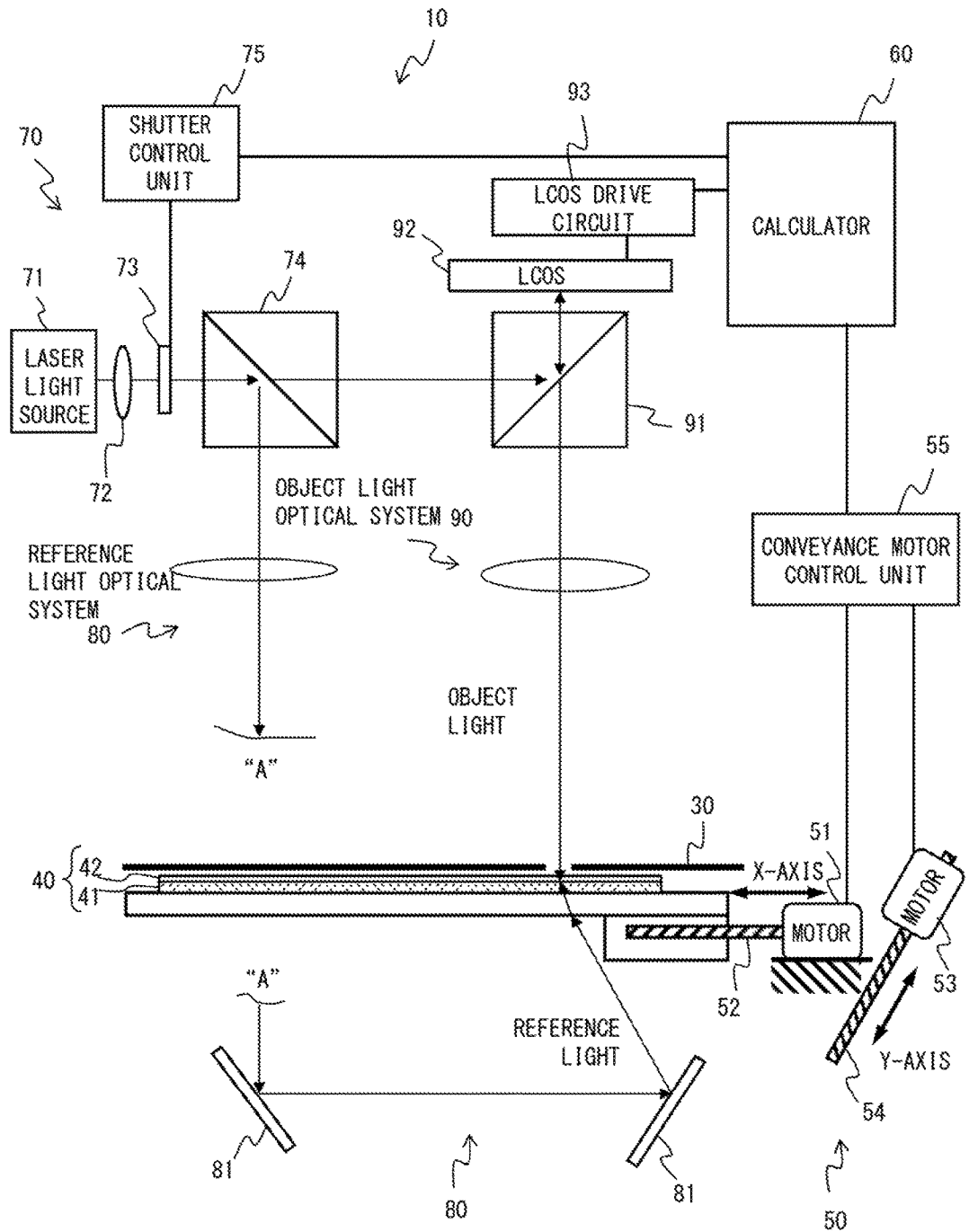
FIG. 2 shows a schematic configuration of an optical system of the hologram array generation apparatus according to the first exemplary embodiment.

A hologram generation apparatus 1 according to this exemplary embodiment is explained with reference to FIGS. 1 and 2. FIG. 1 shows a schematic configuration of the hologram generation apparatus 1 and FIG. 2 mainly shows a schematic configuration of an optical system of the hologram generation apparatus 1. The hologram generation apparatus 1 according to this exemplary embodiment is, for example, a hologram array generation apparatus that generates a hologram array in which roughly rectangular partial holograms are arranged in a matrix pattern. As shown in FIG. 1, the hologram generation apparatus 1 includes an optical system 10, a positioning system 20, a mask 30, a medium 40, a medium conveyance unit 50, and a calculator 60.

The optical system 10 generates object light and reference light from light emitted from a light source and records interference fringes by which a hologram can be reproduced by applying the generated object light and the reference light onto the medium 40. As shown in FIG. 2, the optical system 10 includes a light source unit 70, a reference light optical system 80, and an object light optical system 90.

The light source unit 70 applies (i.e., emits) light from the light source, which serves as yardstick light (or reference light), to the reference light optical system 80 and the object light optical system 90. The light source unit 70 includes a linear polarization laser light source 71, a collimator lens 72, a shutter 73, a beam splitter 74, and a shutter control unit 75.

The laser light source 71 emits yardstick laser light (or reference laser light) and this emitted light is applied to the beam splitter 74 through the collimator lens 72 and the shutter 73. The exposure timing of a hologram is controlled by having the shutter control unit 75 control the open/close of the shutter 73 in accordance with an instruction from the calculator 60.

The beam splitter 74 is a branching unit that branches (i.e., divides) the light emitted from the light source. The beam splitter 74 may be a half mirror or the like. The light, which has passed through the collimator lens 72 and the shutter 73, is branched (i.e., divided) into two lights (i.e., two light beams) by the beam splitter 74. One of the branched lights is applied to the reference light optical system 80 as light for reference light and the other light beam is applied to the object light optical system 90 as light for object light.

The reference light optical system 80 applies the incident light onto the medium 40 as reference light. The medium 40 is formed by coating a base material 41 with a photosensitive material 42. In this example, in order to generate a reflective-type hologram on the medium 40, the reference light optical system 80 needs to apply the reference light to the medium 40 from the side of the medium 40 opposite to the side thereof from which the object light is applied to the medium 40. Therefore, the optical path of the reference light has a roundabout route. The reference light optical system 80 includes a plurality of total reflection mirrors 81. The light from the beam splitter 74 is propagated (i.e., transmitted) through the plurality of total reflection mirrors 81 and is applied from the last total reflection mirror 81 onto a photosensitive surface of the photosensitive material 42 of the medium 40 from the base material 41 side at a desired angle. Note that a transmission-type hologram may be generated by applying the object light and the reference light onto the same surface of the medium. Further, when a light source having a short coherence length is used in order to avoid the occurrence of a phase difference between the object light and the reference light when these two lights (i.e., the two light beams) are made to interfere with each other on the photosensitive material 42, it is necessary to configure the length of the optical path of the reference light optical system so that it is roughly equal to that of the object light optical system.

The object light optical system (an exposure unit) 90 generates object light from incident light by using an SLM and applies the generated object light onto the medium 40. The object light optical system 90 includes a polarization beam splitter 91, an LCOS (an SLM (Spatial Light Modulator)) 92, and an LCOS drive circuit 93.

The polarization beam splitter 91 has a function of branching (i.e., dividing) incident light into reflected light and transmitted light according to the polarization direction. Further, the polarization direction of the laser light source is aligned with the direction in which the light is reflected in the polarization beam splitter 91 in advance, so that the laser light that is branched into light for the reference optical system and light for the object optical system is reflected on the polarization beam splitter 91 and is incident on (i.e., enters) the LCOS that is used as the SLM (Spatial Light Modulator). The laser light reflected inside the polarization beam splitter 91 is incident on the LCOS. However, in this exemplary embodiment, a reflective-type LCOS is used. Therefore, the amount of laser light that is reflected on the LCOS, and then is incident on the polarization beam splitter again and passes therethrough is controlled by changing the polarization direction of the laser light incident on the reflective-type LCOS during the process in which the laser light is incident on the polarization beam splitter and reflected thereon. By controlling the amount of the laser light that is incident on the polarization beam splitter 91 again and passes therethrough in this manner, an amplitude modulation is carried out and object light is thereby generated. The calculator 60 includes an LCIS display control unit (a spatial light modulation control unit) 61 that controls the display of the LCOS 92. The LCOS drive circuit 93 controls a display surface (a reflection surface) of the LCOS 92 in accordance with an instruction of the LCOS display control unit 61, displays interference fringes by which desired object light is reproduced on the display surface, and modulates the amplitude of the light incident on the LCOS 92. Depending on the configuration of the LCOS and the optical system, a phase modulation can also be carried out. By modulating the amplitude, the phase, or both of the amplitude and the phase, the light can be modulated into object light.

The mask 30 having an opening for generating a hologram is disposed on the medium 40. The mask 30 is located above the photosensitive material and serves as a light-shield part for shielding a part where exposure is unnecessary. The light modulated into the object light by the LCOS 92 passes through the polarization beam splitter 91, on which the light is originally incident, and is applied to the photosensitive surface of the photosensitive material 42 of the medium 40 through the opening of the mask 30. Note that the exposure is performed while reducing the size of the reflected light modulated by the LCOS 92 to a size appropriate for interference fringes by an optical system. The fineness of the interference fringes before the reduction of the size of the reflected light depends on the pitch of pixels that forms the LCOS. The pixel pitch of a current LCOS (i.e., an ordinary LCOS) is from several µm to about 10 µm, and is large with respect to the wavelengths of visible light, which are several hundred nm. Therefore, the size of the light is reduced so that the intervals between the interference fringes become at least 1 µm or shorter. The display (or the image) of the LCOS is displayed in a size that takes account of the magnification (i.e., the scaling) of the reduction of the size of the light. Further, the area of the irradiation is limited by an aperture (not shown) so that the exposures by the object light and the reference light are performed from both sides of the photosensitive surface in sizes the same as each other.

The medium conveyance unit 50 is an XY-stage that conveys the medium 40 in XY-directions in order to successively expose the medium 40 to light. The medium conveyance unit 50 includes an X-axis conveyance motor 51, an X-axis movable part 52, a Y-axis conveyance motor 53, a Y-axis movable part 54, and a conveyance motor control unit 55. The X-axis conveyance motor 51 moves the X-axis movable part 52 to the positive/negative side in an X-axis direction and thereby conveys the medium 40 in the X-axis direction. The Y-axis conveyance motor 53 moves the Y-axis movable part 54 to the positive/negative side in a Y-axis direction and thereby conveys the medium 40 in the Y-axis direction. The calculator 60 includes a position control unit (a position determination unit) 62 that controls the position of the medium 40. The conveyance motor control unit 55 controls the X-axis conveyance motor 51 and the Y-axis conveyance motor 53 according to instructions from the position control unit 62 and thereby conveys the medium 40 in the X-axis/Y-axis directions.

Further, the medium conveyance unit 50 may include an inclination adjustment stage that adjusts the inclination of the medium 40. That is, the medium conveyance unit 50 can move the photosensitive material 42 on which a hologram is formed in the two-axis directions, i.e., in the XY-axis directions and has an inclination adjustment function of adjusting the inclination of the photosensitive material 42 by rotating it on the XY-plane. The inclination adjustment function may be provided on the optical system side and configured so that the inclination can be rotationally adjusted around the center of exposure unit.

By recording interference fringes of the object light and the reference light, which are applied from both sides of the photosensitive surface of the medium 40, a partial hologram (a unit hologram) is generated by one exposure. Next, by a control signal from the conveyance motor control unit 55, the X-axis conveyance motor 51 or the Y-axis conveyance motor 53 conveys the medium 40 by a distance equivalent to the size of the partial hologram and then another partial hologram is generated adjacent to the previously-generated partial hologram. As an example, a unit hologram about 300 µm square is generated. The conveyance distance for each unit hologram is also 300 µm. In order to generate unit holograms in a state where they are two-dimensionally laid out on the photosensitive surface, the medium conveyance unit 50 can convey the medium 40 in the mutually-orthogonal two-axis directions, i.e., in the XY-axis directions.

The positioning system 20 determines the position of the medium 40 on which successive exposures are performed. The positioning system 20 can be regarded as a position adjustment system that adjusts the position of the medium 40. The positioning system 20 includes a positioning laser 21 and a positioning PD (Photo-Diode) 22. As described layer, in this exemplary embodiment, positioning holograms are generated for each partial hologram on the medium 40. Further, the positioning laser 21 applies (i.e., emits) laser light to the positioning hologram on the medium 40 and the positioning PD 22 adjusts and determines the position of the medium 40 based on reflected light (diffracted light) from the positioning hologram. A plurality of positioning lasers 21 are provided for respective positioning holograms and a plurality of positioning PDs 22 are provided for respective diffracted lights of the positioning holograms. As a light-receiving device, a position sensitive detector (PSD) may be used or a device whose light-receiving surface is divided into a plurality of sections such as a four-divided sensor may be used.

Figure 3:
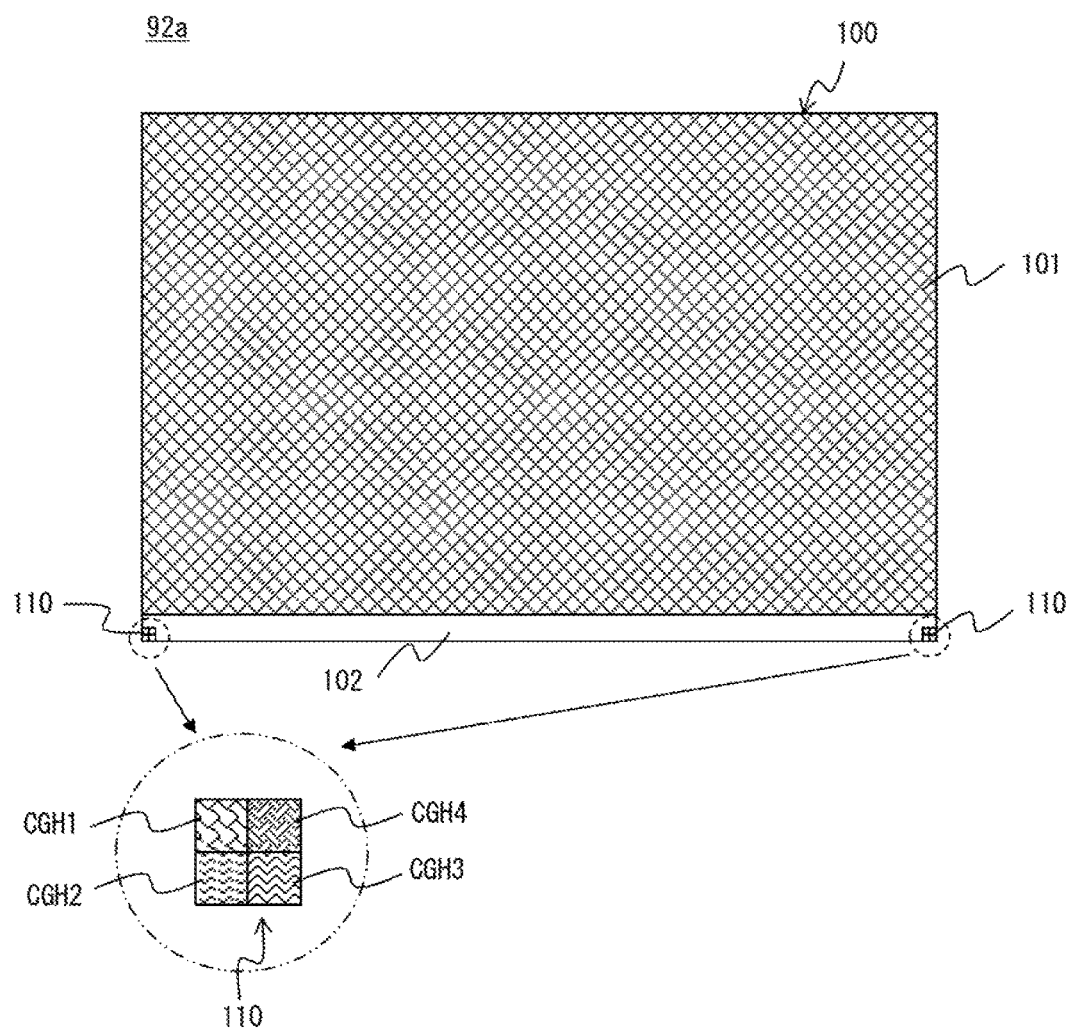
FIG. 3 shows a display area of a spatial light modulator for generating a hologram according to the first exemplary embodiment.

FIG. 3 shows a displayed image on a display surface 92a of the LCOS 92, which is used as the SLM. In this exemplary embodiment, information for reproducing object light (hereinafter also referred to as "object light reproduction information") is not displayed by using the entire LCOS display surface 92a. That is, display areas for generating positioning holograms (position adjustment holograms) (hereinafter referred to as "positioning hologram generation display areas") are formed at corners (i.e., ends) of one long side of the rectangular area and the object light reproduction information is displayed in an area separated from these positioning hologram generation display areas.

The entire LCOS display surface 92a is referred to as an LCOS display area 100. The calculator 60 (the LCOS display control unit 61) forms a display area for generating a partial hologram generation (for generating object light generation) (hereinafter referred to as a "partial hologram generation display area") 101, a non-display area 102, and two positioning hologram generation display areas 110 in the LCOS display area 100. In the partial hologram generation display area 101, object light generation information (object light reproduction information) by which object light for generating a partial hologram (an object hologram) is generated is displayed. In the positioning hologram generation display areas 110, positioning hologram information by which light for generating positioning holograms is generated is displayed. No information is displayed in the non-display area 102. Note that when no information is displayed in the non-display area 102 and hence no hologram is generated there, it is preferred that holograms be generated in such a manner that when an exposure is performed in the next row, the hologram overlaps the non-display area 102 as described later. Further, when the hologram is not generated in such an overlapped manner, information may be displayed in the non-display area 102 and hence a hologram may be generated there.

The non-display area 102 is formed near one side of the LCOS display area 100 and the (first and second) positioning hologram generation display areas 110 are formed at both ends of this side (i.e., at both ends of the non-display area 102). By providing the positioning hologram generation display areas 110 at the corners (both ends) of one long side, the pitch (i.e., the distance) between two positioning holograms can be increased as much as possible and hence the position detection accuracy (the inclination detection accuracy) can be improved. Note that three or more positioning holograms may be generated.

For example, the display surface 92a is composed of 4,320 pixels (vertical)×7,680 pixels (horizontal) and its pixel pitch is 3.5 μm. When the width of the interference fringes is not changed from 3.5 μm, it is too large to generate a hologram. Therefore, the width of the interference fringes is reduced to 0.35 μm by using an optical system that reduces the width of interference fringes by a factor of 10 (i.e., reduces it to 1/10) on the optical surface to generate a hologram. In such a case, a partial hologram that is generated by one exposure has, for example, a vertical length of about 1.5 mm and a horizontal length of about 2.4 mm.

Each of the positioning hologram generation display areas 110, which are disposed at the corners of one long side of the rectangular area, is divided into four areas, i.e., into two rows and two columns for generating CGHs (Computer Generated Holograms). Further, the CGH1 to CGH4 are generated so that they have diffraction angles different from one another for incident light. Each of the positioning hologram generation display areas 110 is divided into a plurality of divided areas around its center. Each of the positioning hologram generation display areas 110 does not necessarily have to be divided into four sections and may be divided into an arbitrary number of sections such as two sections, three sections, and five sections. Note that each of a plurality of positioning hologram generation display areas 110 may be divided into a different number of sections and/or in a different pattern. Further, when it is unnecessary to determine the position of the next exposure in the last column or the last row in successive exposures, no positioning hologram generation display area 110 may be formed and no positioning holograms may be formed.

For example, assume that a CGH is 50 μm square and a whole positioning hologram 210 is 100 μm square. When a large hologram is generated by forming partial holograms in a connected manner, the positioning hologram 100 μm square is inconspicuous because the overall size of the hologram is large. That is, the positioning hologram is preferably formed with as small a size as possible with respect to the whole hologram.

By simultaneously displaying information for object light and positioning information on the optical surface of the LCOS 92 and thereby simultaneously performing exposure for them, the positional relation between them reflects the accuracy of the pixel arrangement, thus enabling extremely accurate position reproducibility. For example, since the LCOS 92 can rewrite a displayed image at a rate of 60 frames per second, it can continuously generate unique holograms. Further, by using these unique holograms as partial holograms, it is possible to generate a large hologram in which these partial holograms constitute one design (i.e., one picture) as a whole.

Note that regarding the adjustment (correction) method performed in the positioning process, a correction may be made by shifting pixels of the LCOS display, instead of using the correction method in which the medium is mechanically moved by the medium conveyance unit or the like. In the case of the method in which the display pixels are shifted, they can be moved on a pixel pitch basis. The adjustment method is not limited to the method in which the photosensitive material or the optical system is physically moved according to the amount of light received from the positioning hologram. That is, when the amount of a deviation can be accurately known, it is possible to change the display data in the LCOS to achieve the alignment. In such a case, although the display position is changed on a pixel pitch basis, there is a merit that since the correction is made just by performing calculation and changing the display, it can be carried out in a short time. Further, there is no need to take mechanical durability and the like into consideration. Further, it is possible to employ both of the above-described methods at the same time. For example, a correction in the inclination can be mechanically made and a correction for a deviation in the XY-directions can be made by shifting the display pixels. When a correction is made by shifting the pixels of the LCOS display, a method in which diffracted light from positioning CGHs is observed and the display in the LCOS is shifted according to an amount by which light-receiving coordinates are deviated from a desired position at the time of the exposure is employed.

Figure 4A:
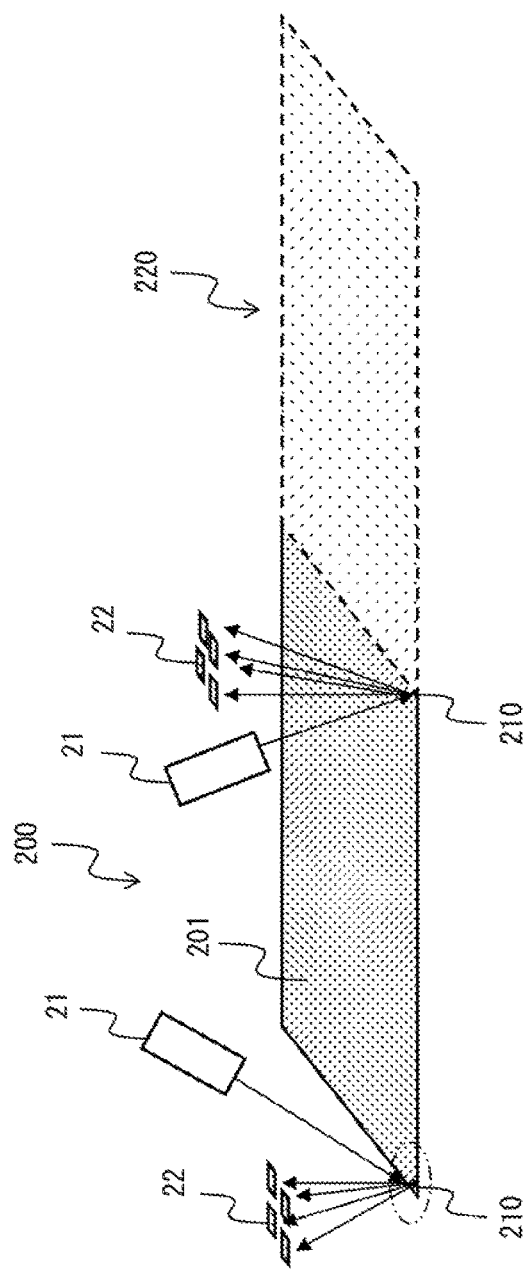
FIG. 4A is an explanatory diagram for explaining a positioning operation performed by the hologram array generation apparatus according to the first exemplary embodiment.

A positioning method that is performed when a partial hologram exposure is performed in this exemplary embodiment is explained with reference to FIGS. 4A to 4C. As shown in FIG. 4A, when an exposure is performed according to the display of the LCOS 92 shown in FIG. 3, a partial hologram (an object reproduction hologram) 201 and two positioning holograms 210 are generated on a hologram surface 200 of the medium 40.

In the hologram generation apparatus 1, two positioning lasers 21 are provided in the positioning system 20 disposed adjacent to the optical system 10 that performs the exposure. When the position of an intended exposure range 220 is determined (adjusted), the positioning lasers 21 are disposed so that they apply (i.e., emit) laser light to the positioning holograms 210 formed in the preceding process through holes formed in the mask 30.

Figure 5:
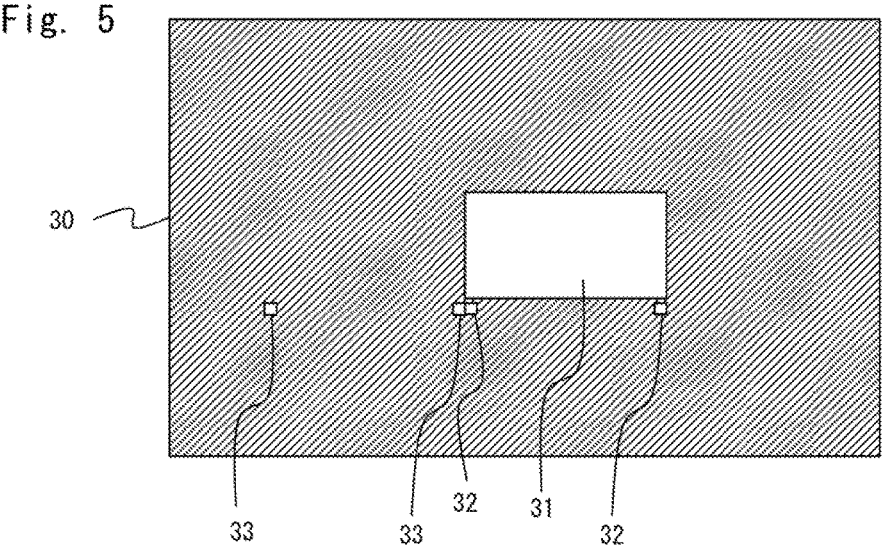
FIG. 5 shows a mask shape for generating a hologram according to the first exemplary embodiment.

For example, as shown in FIG. 5, a partial hologram generation hole 31, which is used in the exposure process, and two positioning hologram generation holes 32 are formed in the mask 30. Further, two positioning holes 33 for irradiation of positioning holograms, which are used in the alignment process, are also formed in the mask 30. The positioning lasers 21 apply laser light to the positioning holograms 210 through these positioning holes 33. As shown in FIG. 5, the shape of the mask 30 is formed with consideration given to the alignment. Note that an adjustable mask in which openings are changed may be used.

Laser light that is applied to the positioning hologram 210 is diffracted by the CGH1 to CGH4 of the positioning hologram 210 and four diffracted lights (i.e., four diffracted light beams) are received by positioning PDs (Photo-Diodes) 22-1 to 22-4. The calculator 60 (the position control unit 62) adjusts and determines the position of the intended exposure range 220 based on the level of the light received in the positioning PDs 22.

Figure 4B:
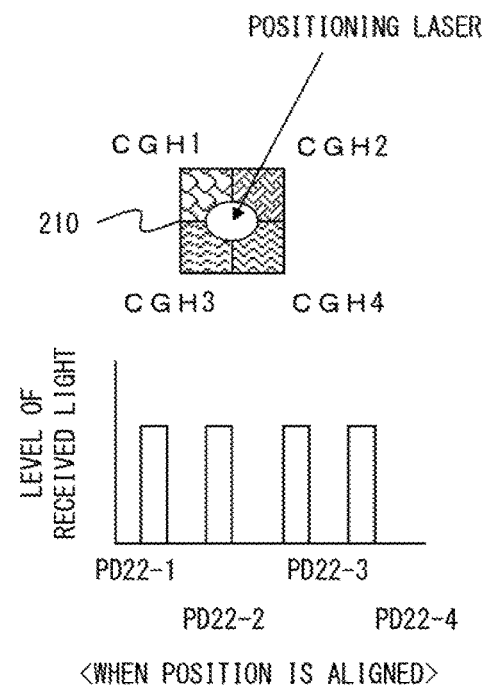
FIG. 4B is an explanatory diagram for explaining the positioning operation performed by the hologram array generation apparatus according to the first exemplary embodiment.

As shown in FIG. 4B, when the laser light from the positioning laser 21 is applied to the center (the middle) of the positioning hologram 210 with two rows and two columns, the laser light is uniformly applied to the CGH1 to CGH4. Therefore, the levels of the lights received by the positioning PDs 22-1 to 22-4 are equal to each other. When the levels of the light received by the positioning PDs 22-1 to 22-4 are equal to each other, the calculator 60 (the position control unit 62) determines that the position of the intended exposure range 220 is appropriate.

Figure 4C:
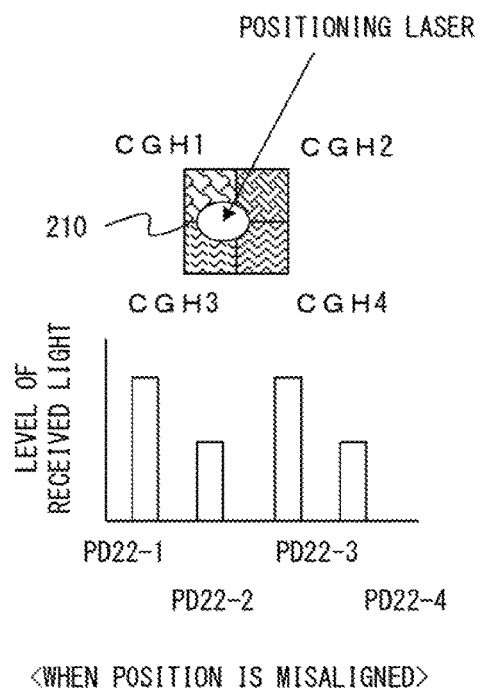
FIG. 4C is an explanatory diagram for explaining the positioning operation performed by the hologram array generation apparatus according to the first exemplary embodiment.

As shown in FIG. 4C, when the laser light from the positioning laser 21 is off the center of the positioning hologram 210 with two rows and two columns, a larger amount of laser light is applied to one (or some) of the CGH1 to CGH4. Therefore, there are variations among the levels of the lights received by the positioning PDs 22-1 to 22-4. When the levels of the lights received by the positioning PDs 22-1 to 22-4 differ from each other, the calculator 60 (the position control unit 62) detects a deviation of the position of the intended exposure range 220 and hence adjusts the position of the medium 40 by controlling the conveyance performed by the medium conveyance unit 50 so that the levels of the received lights become equal to each other.

For example, even when the size of the positioning hologram 210 is 100 μm square and the medium conveyance unit 50 is an ordinary automatic stage, the size of the positioning hologram 210 is satisfactory because the accuracy of the positioning is in the order of several μm.

By using two positioning holograms 210 to make an adjustment, it is possible to adjust the inclination (in the Z-direction) in addition to the amount of displacement in the XY-directions. That is, the calculator 60 determines the level of light received by one of the positioning PDs 22 and that of light received by the other positioning PD 22. Then, when the levels of the received lights are equal to each other, the calculator 60 determines that the medium 40 is horizontal, whereas when the levels of the received lights differ from each other, the calculator 60 determines that the medium 40 is inclined.

Next, a hologram generation method for generating partial holograms in a connected manner according to this exemplary embodiment is explained with reference to FIGS. 6A to 6D.

Figure 6A:
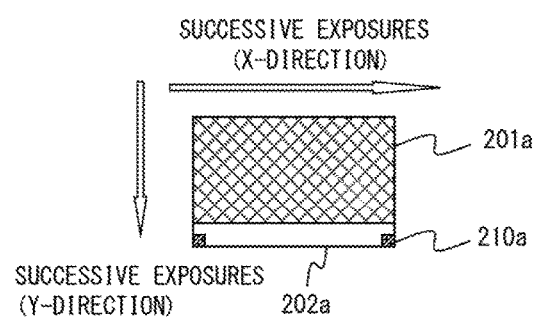
FIG. 6A is an explanatory diagram for explaining a hologram generation method according to the first exemplary embodiment.

Firstly, as shown in FIG. 6A, the hologram generation apparatus 1 generates a first partial hologram. After fixing the medium 40 in a yardstick position (or a reference position), the hologram generation apparatus 1 displays information for generating a partial hologram and information for generating positioning holograms in the partial hologram generation display area 101 and the positioning hologram generation display areas 110, respectively, of the LCOS 92. Then, the hologram generation apparatus 1 applies generated object light and reference light onto the photosensitive material 42 of the medium 40. As a result, a partial hologram (an object reproduction hologram) 201a corresponding to the partial hologram generation display area 101 of the LCOS 92 is formed. Further, two positioning holograms 210a corresponding to the positioning hologram generation display areas 110 are formed. No hologram is generated in a non-generation area 202a corresponding to the non-display area 102.

Figure 6B:
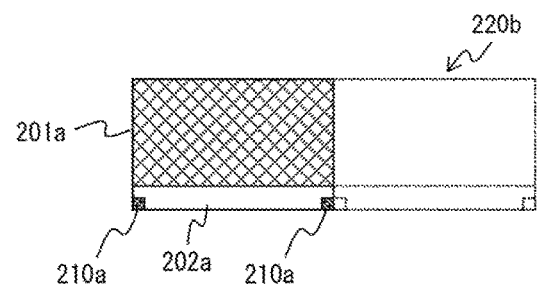
FIG. 6B is an explanatory diagram for explaining the hologram generation method according to the first exemplary embodiment.

Next, as shown in FIG. 6B, the hologram generation apparatus 1 aligns (or positions) an intended exposure range 220b for which exposure is performed next. In order to generate a partial hologram to the immediate right of the partial hologram 201a generated in FIG. 6A (i.e., adjacent to the partial hologram 201a in the X-direction), the hologram generation apparatus 1 applies laser light from the positioning laser 21 to the two positioning holograms 210a generated in FIG. 6A and receives diffracted light from the positioning holograms 210a by the positioning PDs 22 before generating the partial hologram. The hologram generation apparatus 1 performs alignment in the XY-directions and for the inclination by determining the levels of the light received by the positioning PDs 22.

Figure 6C:
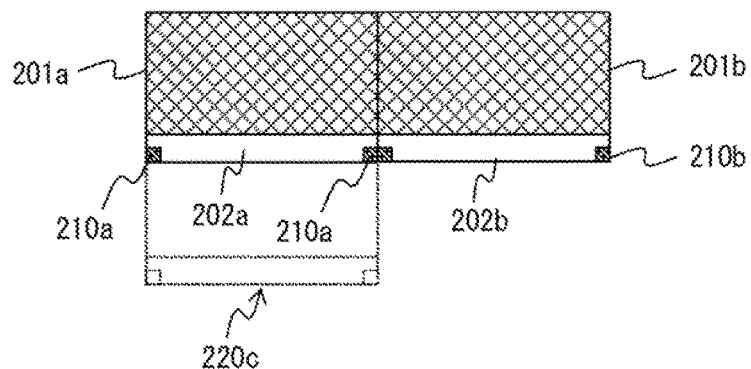
FIG. 6C is an explanatory diagram for explaining the hologram generation method according to the first exemplary embodiment.

Next, as shown in FIG. 6C, after generating a partial hologram 201b and positioning holograms 210b in the intended exposure range 220b shown in FIG. 6B, the hologram generation apparatus 1 aligns (or positions) an intended exposure range 220c for which exposure is performed next. The hologram generation apparatus 1 generates the partial hologram 201b and the positioning holograms 210b in the intended exposure range 220b in a manner similar to that explained above with reference to FIG. 6A. Then, in order to generate a partial hologram below the partial hologram 201a generated in FIG. 6A (i.e., adjacent to partial hologram 201a in the Y-direction) in a connected manner, the hologram generation apparatus 1 performs alignment by applying laser light to the two positioning holograms 210a generated in FIG. 6A in a manner similar to that explained above with reference to FIG. 6B before generating the partial hologram.

Figure 6D:
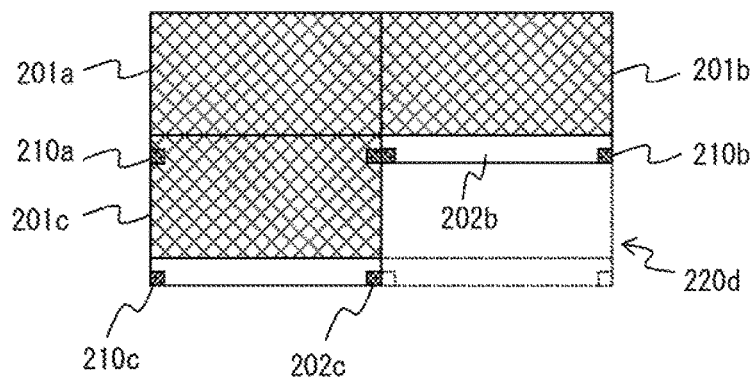
FIG. 6D is an explanatory diagram for explaining the hologram generation method according to the first exemplary embodiment.

Next, as shown in FIG. 6D, after generating a partial hologram 201c and positioning holograms 210c in the intended exposure range 220c shown in FIG. 6C, the hologram generation apparatus 1 aligns (or positions) an intended exposure range 220d for which exposure is performed next. The hologram generation apparatus 1 generates the partial hologram 201c and the positioning holograms 210c in the intended exposure range 220c in a manner similar to that explained above with reference to FIG. 6A. In this process, the hologram generation apparatus 1 generates the partial hologram 201c so that it overlaps the positioning hologram 210a generated in FIG. 6A and the non-generation area 202a. By doing so, the hologram generation apparatus 1 can generate the partial holograms adjacent to each other and can make the positioning holograms inconspicuous. In order to generate a partial hologram to the immediate right of the partial hologram 201c (i.e., adjacent in the X-direction), the hologram generation apparatus 1 performs alignment by applying laser light to the two positioning holograms 210c in a manner similar to that explained above with reference to FIG. 6B before generating the partial hologram. After that the hologram generation apparatus 1 generates a partial hologram 201 and positioning holograms 210 in the intended exposure range 220d and thereby forms (i.e., generates) a hologram array with two rows and two columns.

Note that in FIG. 6D, the alignment may be performed by using the positioning holograms 210b instead of the positioning holograms 210c, or by using both of the positioning holograms 210b and 210c. Positioning holograms 210 that are not used may not be generated. Further, a hologram may be generated in the non-generation area 202.

Figure 7:
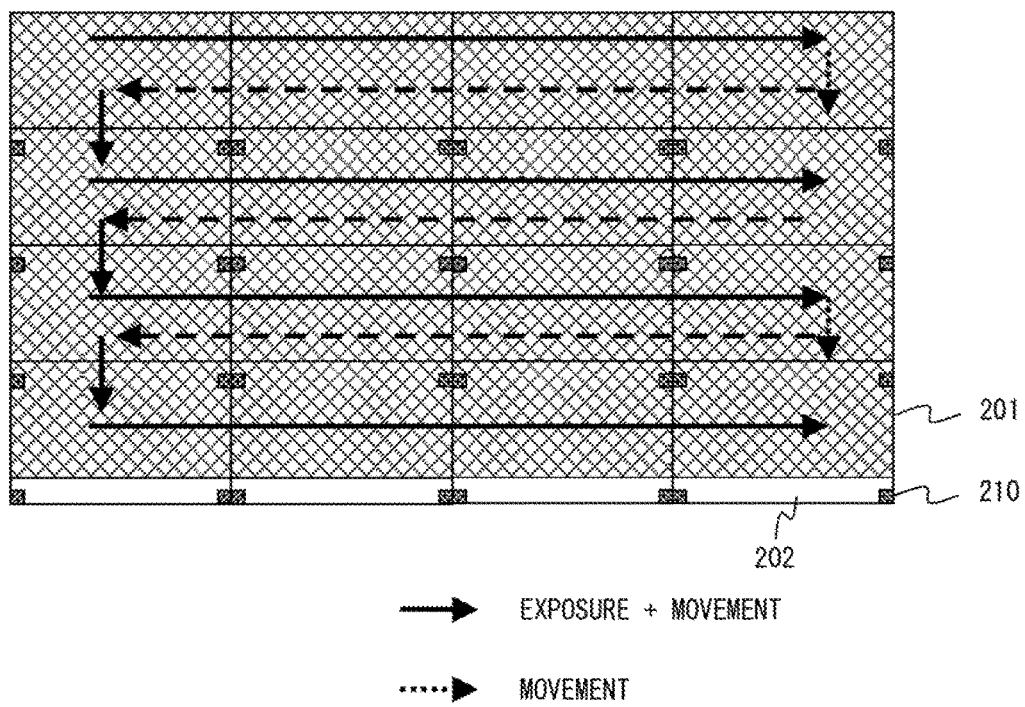
FIG. 7 shows a generation sequence of the hologram generation method according to the first exemplary embodiment.

FIG. 7 shows an example of the generation of a hologram array with four rows and four columns. As shown in FIG. 7, four partial holograms 201 and positioning holograms 210 are successively generated in the first row. Next, four partial holograms 201 and positioning holograms 210 are successively generated in each of the second, third and fourth rows. When a partial hologram 201 is generated, alignment is performed by using adjacent positioning holograms 210 in a manner similar to that explained above with reference to FIGS. 6A to 6D. Since partial holograms are formed while successively correcting their positions and inclinations so that they are correctly arranged, a large hologram can be generated within the permissible range for the moving distance of the stage. When doing so, the required accuracy of the stage may be in the order of several μm.

As described above, according to this exemplary embodiment, unique partial holograms can be accurately arranged in a connected manner without using an expensive and accurate conveyance device like one used for a machine tool. Therefore, it is possible to provide an apparatus capable of easily and accurately generating a large hologram that is an aggregate of partial holograms.

In this exemplary embodiment, in an apparatus in which: laser light, which is used as a light source, is branched into two lights (i.e., into two light beams); one of the branched light is used as reference light; the other branched light is made incident on an LCOS, which is used as an SLM, and used as object light by modulating its phase and amplitude; and a hologram is generated by interference between the reference light and the object light, it makes possible to generate unique holograms each of which has different individual information by rewriting information to be displayed in the LCOS without using a hologram original plate, and it is possible to generate a large hologram, which represents a design (i.e., a picture), one collective information piece, or the like as a whole, by successively generating partial holograms, which are parts of the complete large hologram, on the same surface (or the same plane) by the display in the LCOS.

When such a large hologram is generated by laying out multiple unique holograms on the same surface (or the same plane), it is necessary to make seams between holograms, each of which is generated by one exposure, inconspicuous by arranging them in an orderly manner.

However, as described above, Patent Literature 1 has a configuration in which a photosensitive material is placed on an XY-stage and successive exposures are performed by moving the photosensitive material. Therefore, the accuracy of the movement is determined based on the accuracy of the stage. Further, no correction can be made for the inclination.

Therefore, although no problem occurs within the range in which the stage can be accurately moved, when the moving range increases to generate a large hologram, a deviation occurs. Consequently, there is a problem that it is necessary to introduce an expensive stage to improve the accuracy. Meanwhile, in Patent Literature 2, when partial holograms are holograms unique to each other, it is necessary to prepare hologram original plates (patterns) each of which corresponds to a respective one of the types of holograms and to replace the hologram original plates with one another. Therefore, there is a problem that it is difficult to accurately generate all the holograms in a state where they are accurately arranged.

Therefore, in this exemplary embodiment, object light reproduction information and information of computer generated holograms for positioning a hologram generation area, which is generated in an adjacent area, are displayed on the same display surface of an LCOS that reproduces object light. Since the object light information of the hologram and the information for positioning the adjacent hologram are displayed on the display surface of the LCOS at the same time, it is possible to manage the positional relation between them with the accuracy of the pixel arrangement. Therefore, since the generation of a hologram and the positioning of a hologram to be generated next can be simultaneously performed for each exposure, the arrangement of holograms is not lost (or collapsed) even when the large hologram, which is generated by a multi-layout arrangement, becomes enormous. Consequently, it is possible to generate unique holograms without leaving any space therebetween.

For example, positioning hologram use two computer generated holograms (CGHs) partitioned into two rows and two columns, or three rows and three columns having different diffraction angles. Then, at the time of positioning for exposure, light having a frequency band other than the frequency band to which a photosensitive material is sensitive is applied to the positioning holograms and diffracted light is received by a light-receiving device. Further, the positioning is performed based on the level of received light for each area. By providing the two positioning holograms, it is possible to control the inclination as well as the position in the XY-directions. Therefore, it is possible to successively form holograms in a state where no space exists between adjacent holograms. By using a plurality of positioning holograms and using a plurality of CGHs, it is possible to detect various types of deviations and to accurately perform positioning.

In the case where an exposure unit is conveyed by an automatic stage without performing positioning, it is expected that a deviation of about 1 to 4 μm could occur as the exposure unit is moved by 100 mm to 200 mm. When the moving distance is relatively short, no problem occurs in the conveyance by the automatic stage. However, for example, a stage for a machine tool capable of accurately moving an object to be moved for a long distance is expensive. According to this exemplary embodiment, it is possible to improve the positioning accuracy and hence to use an inexpensive stage. According to this exemplary embodiment, it is possible to provide a hologram generation apparatus and a hologram generation method capable of easily and accurately generating a hologram.

Second Exemplary Embodiment

Figure 8:
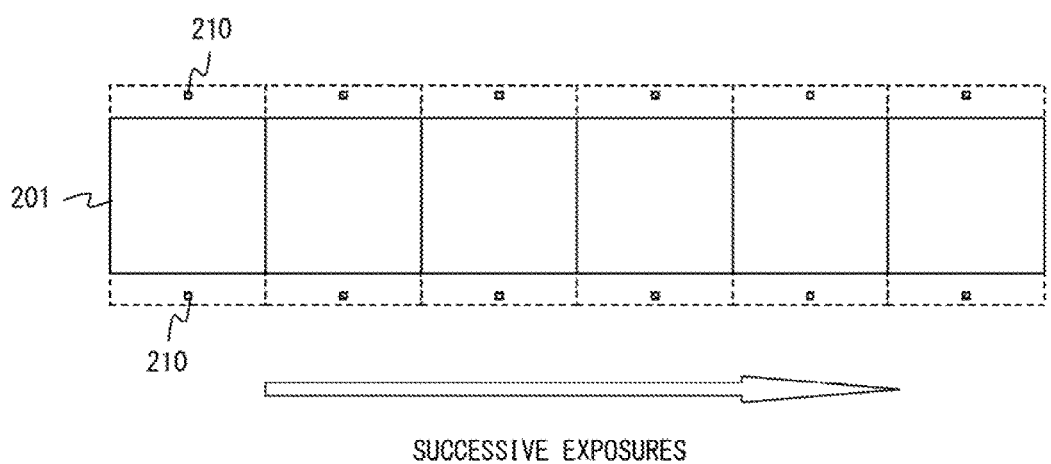
FIG. 8 shows an example of a positioning hologram of a hologram array according to a second exemplary embodiment.

In the first exemplary embodiment, positioning holograms are generated to both ends of one side of a partial hologram. However, various arrangements are possible, provided that the restriction on the optical system for exposures and the arrangement of the light-emitting unit and the light-receiving unit necessary for the positioning is satisfied. FIG. 8 is an example of an arrangement of positioning holograms according to a second exemplary embodiment. As shown in FIG. 8, positioning holograms 210 may be formed near two opposing sides of a partial hologram 201. Even when positioning holograms are generated at arbitrarily-selected two places as shown above, positioning can be accurately performed as in the case of the first exemplary embodiment.

Note that the present invention is not limited to the above-described exemplary embodiments, and various modifications can be made without departing from the spirit of the present invention.

Each component such as a calculator and a control unit in the above-described exemplary embodiments may be constructed by software, hardware, or both of them. Further, each component may be constructed by one hardware device or one software program, or a plurality of hardware devices or a plurality of software programs. Each function (each process) may be implemented by a computer including a CPU, a memory, and so on. For example, a program for performing a generation method according to an exemplary embodiment may be stored in a storage device and each function may be implemented by having a CPU execute the program stored in the storage device.

Such a program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the exemplary embodiments disclosed above can be described as, but not limited to, the following supplementary notes.

(Supplementary Note 1)

A hologram array generation apparatus capable of successively generating holograms, the holograms being generated by using an optical device capable of modulating one or both of a phase and an amplitude of light as an SLM (Spatial Light Modulator) and exposing a photosensitive surface to object light, wherein an LCOS is used as the SLM and object light information of a hologram and a positioning hologram are simultaneously displayed on a display surface of the LCOS, and at least two positioning hologram information pieces are provided on a rectangular or square display surface of the LCOS and can be adjusted on two orthogonal axes on a photosensitive surface and in a rotational direction.

(Supplementary Note 2)

The hologram array generation apparatus described in Supplementary note 1, wherein the positioning hologram is formed by a computer generated hologram array with two rows and two columns, each area of the two rows and two columns having a different diffraction angle.

(Supplementary Note 3)

The hologram array generation apparatus described in Supplementary note 1 or 2, comprising a method for correcting an amount of deviation and an inclination of the two orthogonal axes on the photosensitive surface obtained from the positioning hologram information by a change in display of the LCOS.

(Supplementary Note 4)

A hologram array generation apparatus, wherein object light information of a hologram and positioning information are provided on a display surface of an SLM, at least two positioning information pieces are provided in predetermined areas and are provided so that they provide different diffraction angles for incident light, and the hologram array generation apparatus can be moved on two orthogonal axes with respect to the display surface and can be rotated.

The present invention can be applied to a hologram generation apparatus and a hologram generation method, and in particular to a hologram generation apparatus including a spatial light modulator unit and a hologram generation method.

What is claimed is:

1. A hologram generation apparatus comprising:
a spatial light modulation unit configured to modulate incident light;
a spatial light modulation control unit configured to form an object hologram generation area and first and second positioning hologram generation areas on a modulation surface of the spatial light modulation unit;
an exposure unit configured to apply object light onto a recording medium and generate a first object hologram, and first and second positioning holograms, the object light being generated based on the object hologram generation area and the first and second positioning hologram generation areas; and
a position determination unit configured to determine a position of a second object hologram based on positions of the generated first and second positioning holograms, the second object hologram being a hologram to be generated on a periphery of the first object hologram.

2. The hologram generation apparatus according to claim 1, wherein the position determination unit applies light to the first and second positioning holograms and determines a position of the second object hologram based on diffracted light from the first and second positioning holograms.

3. The hologram generation apparatus according to claim 2, wherein
the first or second positioning hologram generation area includes a plurality of divided areas configured to generate holograms having diffraction angles different from each other, and
the position determination unit determines a position of the second object hologram based on a plurality of diffracted lights from the first or second positioning holograms generated based on the plurality of divided areas.

4. The hologram generation apparatus according to claim 3, wherein the first or second positioning hologram generation area is divided into the plurality of divided areas around a center of the first or second positioning hologram generation area.

5. The hologram generation apparatus according to claim 3, wherein the position determination unit determines the position of the second object hologram according to whether or not levels of the plurality of diffracted lights are equal to each other.

6. The hologram generation apparatus according to claim 1, wherein the first and second positioning hologram generation areas are formed near both ends of the object hologram generation area.

7. The hologram generation apparatus according to claim 1, wherein the position determination unit determines a place where the second object hologram is generated so that the place includes an area where the first and second positioning holograms are generated.

8. The hologram generation apparatus according to claim 1, wherein the first and second positioning hologram generation areas are formed in a non-object hologram generation area where no object hologram is generated.

9. The hologram generation apparatus according to claim 8, wherein the position determination unit determines a place where the second object hologram is generated so that the place includes an area where no object hologram is generated by the non-object hologram generation area.

10. A hologram generation method comprising:

forming an object hologram generation area and first and second positioning hologram generation areas on a modulation surface of a spatial light modulation unit;

applying object light onto a recording medium and generating a first object hologram, and first and second positioning holograms, the object light being generated based on the object hologram generation area and the first and second positioning hologram generation areas; and determining a position of a second object hologram based on positions of the generated first and second positioning holograms, the second object hologram being a hologram to be generated on a periphery of the first object hologram.

* * * * *